United States Patent [19]
Simons et al.

[11] Patent Number: 5,917,549
[45] Date of Patent: Jun. 29, 1999

[54] TRANSFORMING IMAGES WITH DIFFERENT PIXEL ASPECT RATIOS

[75] Inventors: David P. Simons, Lynnfield, Mass.; Scott S. Snibbe; Daniel M. Wilk, both of Seattle, Wash.

[73] Assignee: Adobe Systems Incorporated, San Jose, Calif.

[21] Appl. No.: 08/693,943

[22] Filed: Aug. 7, 1996

[51] Int. Cl.⁶ .............................. H04N 7/01; H04N 9/74
[52] U.S. Cl. ...................... 348/441; 348/584; 348/578; 348/445
[58] Field of Search ................................ 348/588, 564, 348/441, 445, 584; 345/435, 113–115, 127, 154

[56] References Cited

U.S. PATENT DOCUMENTS

| | | | |
|---|---|---|---|
| 5,119,074 | 6/1992 | Greaves et al. ........................... | 345/154 |
| 5,327,156 | 7/1994 | Masukane et al. ...................... | 345/113 |
| 5,384,904 | 1/1995 | Sprague et al. .......................... | 395/139 |
| 5,434,625 | 7/1995 | Willis ...................................... | 348/564 |
| 5,442,406 | 8/1995 | Altmanshofer et al. ................. | 348/588 |
| 5,448,307 | 9/1995 | Gelissen et al. ......................... | 348/584 |
| 5,499,039 | 3/1996 | Mistrot .................................... | 345/115 |
| 5,504,535 | 4/1996 | Abe .......................................... | 348/588 |
| 5,528,301 | 6/1996 | Hau et al. ................................. | 348/441 |
| 5,539,534 | 7/1996 | Hiono et al. ............................. | 358/452 |
| 5,568,600 | 10/1996 | Kaba ........................................ | 395/137 |
| 5,572,259 | 11/1996 | Nohara .................................... | 348/441 |
| 5,710,573 | 1/1998 | Hung et al. .............................. | 345/127 |

*Primary Examiner*—Victor R. Kostak
*Attorney, Agent, or Firm*—Fish & Richardson P.C.

[57] ABSTRACT

A method for compositing first and second digital images having different pixel aspect ratios to reduce distortion of image content. The method includes determining a scaling factor from first and second pixel aspect ratios; scaling a first image by the scaling factor; and compositing the first and second images into a composite image. The scaling step may be limited to stretching or squashing the first image in only a horizontal direction. The scaling step may include resampling the first image. In another aspect, the invention features a method for controlling motion along a motion path in a composition having nonsquare pixels. The method includes determining a scaling factor based on the composition pixel aspect ratio; applying the scaling factor to a copy of the motion path; reparameterizing the copy of the motion path to generate a scaled motion mapping; and using the scaled motion mapping to control motion along the motion path. The motion path may define the motion of a layer in the composition.

24 Claims, 3 Drawing Sheets

TRANSFORMING IMAGES WITH DIFFERENT PIXEL ASPECT RATIOS

BACKGROUND

This invention relates to the computer-implemented processing of operations performed on digital images from source to destination having different pixel aspect ratios.

Programmed computers can be used to edit and create images and movies. For example, a computer program product called After Effects, available from Adobe Systems Incorporated of Mountain View, Calif., is licensed for used on a variety of personal computers and provides its user the ability to edit and create movies by integrating and arranging images and pieces of footage. The images in such systems are digital (discrete) arrays of values, each value associated with a picture element (pixel). A pixel may be addressed as a point in a space, typically a planar surface of two dimensions. However, when displayed on a display monitor or produced on an output device, a pixel covers an area and has a horizontal and vertical dimension. For the purposes of this specification, a pixel may be thought of as having rectangular dimensions (which includes the square as a special case). A grid of pixels defines a graphical frame of predetermined dimensions. For example, the D1 NTSC video standard employs a frame of 720×486 pixels.

The ratio of the dimensions of the frame defines a "frame aspect ratio". Similarly, the ratio of the dimensions of the pixels composing the frame defines a "pixel aspect ratio". The pixel aspect ratio of a square pixel is one, and it is said to have a "square pixel aspect ratio". Standard computer video display monitors have a frame aspect ratio of 4:3 (width to height) and square pixels.

If the pixels are not square, the pixels are said to have a "nonsquare pixel aspect ratio". D1 NTSC video, for example, does not have a 4:3 frame aspect ratio and has pixels that are taller than they are wide. D1 PAL pixels, on the other hand, are wider than they are tall. The present invention will find application whatever the nature of the differences in pixel aspect ratio.

SUMMARY OF THE INVENTION

In general, in one aspect, the invention features a method for compositing a plurality of digital images having different pixel aspect ratios to reduce distortion of image content, the plurality of images including a first image having a first pixel aspect ratio and a second image having a second, different pixel aspect ratio. The method includes the steps of determining a scaling factor from the first and second pixel aspect ratios; scaling the first image by the scaling factor; and compositing the first and second images into a composite image. Preferred embodiments of the invention include one or more of the following features. The scaling step is limited to stretching or squashing the first image in only a horizontal direction. The scaling step includes resampling the first image.

In general, in another aspect, the invention features an image composition system for composing a plurality of images having different pixel aspect ratios to reduce distortion of image content, the plurality of images including a first image having a first pixel aspect ratio and a second image having a second, different pixel aspect ratio. The system includes means for determining a scaling factor from the first and second pixel aspect ratios; and means for scaling the first image by the scaling factor.

In general, in another aspect, the invention features a computer program tangibly recorded on a computer-readable medium for composing a plurality of digital images having different pixel aspect ratios, the plurality of images including a first image having a first pixel aspect ratio and a second image having a second, different pixel aspect ratio. The computer program includes instructions for causing the computer to determine a scaling factor from the first and second pixel aspect ratios; and to scale the first image using the scaling factor to reduce distortion of image content when the first image is composited with the second image.

In general, in another aspect, the invention features a method for controlling motion along a motion path in a composition having nonsquare pixels. The method includes the steps of determining a scaling factor based on the composition pixel aspect ratio; applying the scaling factor to a copy of the motion path; reparameterizing the copy of the motion path to generate a scaled motion mapping; and using the scaled motion mapping to control motion along the motion path. Preferred embodiments of the invention include one or more of the following features. The motion path defines the motion of a layer in the composition.

In general, in another aspect, the invention features a computer program tangibly recorded on a computer-readable medium for controlling motion along a motion path in a composition having nonsquare pixels. The computer program includes instructions for causing a computer to determine a scaling factor based on the composition pixel aspect ratio; to apply the scaling factor to a copy of the motion path; to reparameterize the copy of the motion path to generate a scaled motion mapping; and to use the scaled motion mapping to control motion along the motion path.

Among the advantages of the invention are one or more of the following. Composition of images having different pixel aspect ratios can be made in a distortion-free manner. The definition of motion made in reference to one pixel aspect ratio can be applied to an image that travels in a frame having a different pixel aspect ratio without distortion. An image composition system can provide a distortion-free integration of images composed of nonsquare pixels with images composed of square pixels. An image composition system can provide a distortion-free integration of sampled images having different pixel aspect ratios. An image composition system can blend several layers of video images together into a single video composition, in which the image composing each layer may have a pixel aspect ratio that differs from the images of the other layers and/or the composition.

Other features and advantages of the invention will become apparent from the following description and from the claims.

DETAILED DESCRIPTION

Figure 1:
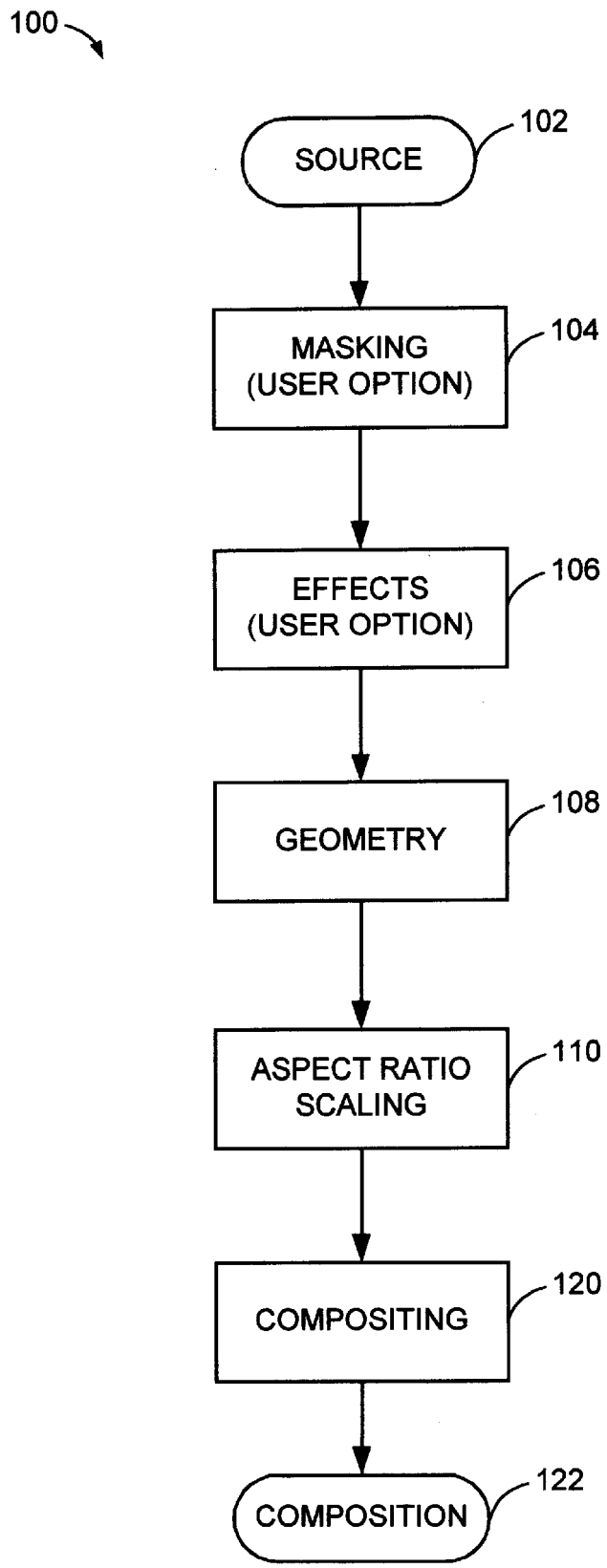
FIG. 1 is a flow chart showing a method for scaling a source to compensate for a different destination pixel aspect ratio.

Referring to FIG. 1, a digital compositing process 100 may be used to take a source image item 102 (such as a simple image, footage in a video format or film format, line art images or footage, or a composition of images and footage) having one pixel aspect ratio (the "source aspect ratio"), process and transform it in accordance with user-selected options or commands, and composite it (120) into a destination, typically a composition 122, having a different pixel aspect ratio (the "destination aspect ratio"). The compositing process may be implemented as a computer program that is run on a general or special purpose computer.

Depending on the user's selections, processing may include operations of masking (104) and applying effects (106). A geometry step (108) is always performed; however, the user may select options resulting in a geometry transformation that is an identity transform.

To reduce distortion of source content, the source item is scaled to the composition by a scaling factor proportional to the ratio of the destination aspect ratio to the source aspect ratio. To avoid possible mixed-field artifacts arising with interleaved-field video material, the scaling is preferably done only in a horizontal direction to avoid stretching an even half-frame into odd half-frame pixels, for example. The source and destination aspect ratios are single numbers representing the horizontal aspect when the vertical dimension is normalized to one. Thus, for a source pixel aspect ratio of 4:3 (horizontal:vertical), the source aspect ratio is 1.33. The horizontal scaling factor ("HSF") is then the destination aspect ratio divided by the source aspect ratio.

To calculate the HSF, the aspect ratios must be known. A compositing system may obtain these from the user, or it may attempt to determine them automatically. Automatic calculation may be based on typical frame characteristics. For example, an image having a 720×486 frame size may be assumed to have a D1 NTSC pixel aspect ratio. The source item is stretched by a factor of HSF, which may be less than one and so result in a squashing of the item. This stretching is accomplished using a conventional image resampling technique to increase (or decrease) the number of destination pixels given to the item by a factor of HSF. While any image resampling technique may be used, it is sufficient to use a simple inverse mapping with a box filter and a bounding rectangle at the source.

The aspect ratio scaling of the source item is done conceptually as the last step 110 in the geometry operations 108. In actual practice, the scaling is simply the last transformation matrix, applied after any other required or requested geometry operations, and all the geometry transformation matrices are concatenated into one matrix.

A masking operation (104) may include a scaling step if there is a difference in pixel aspect ratio between the source item and the destination, and if the user requests a mask having a perfect shape such as a square or circle. In this case, scaling is used in creating the mask to yield the intended perfect shape in the composition.

A composition system typically provides a set of effects and allows users to add further effects as plug-ins. Typical effects include effects that blur or sharpen an image, such as a channel blur, a motion blur, and a radial blur; channel effects that manipulate or convert separate channels of an image; effects that distort an image; and effects that change pixel color values. Effects operations, performed at step 106, need not consider for pixel aspect ratio differences, because the step of scaling for aspect ratios (110) will compensate for the differences.

The geometric operations 108 may include user-selected operations such as image translation, sizing, and rotation, as well as operations provided automatically, such as sizing a footage item of one frame size to fit it into a composition frame of a different frame size. It is important that these operations be performed on the source item before the item is scaled to compensate for pixel aspect ratio differences.

Figure 2:
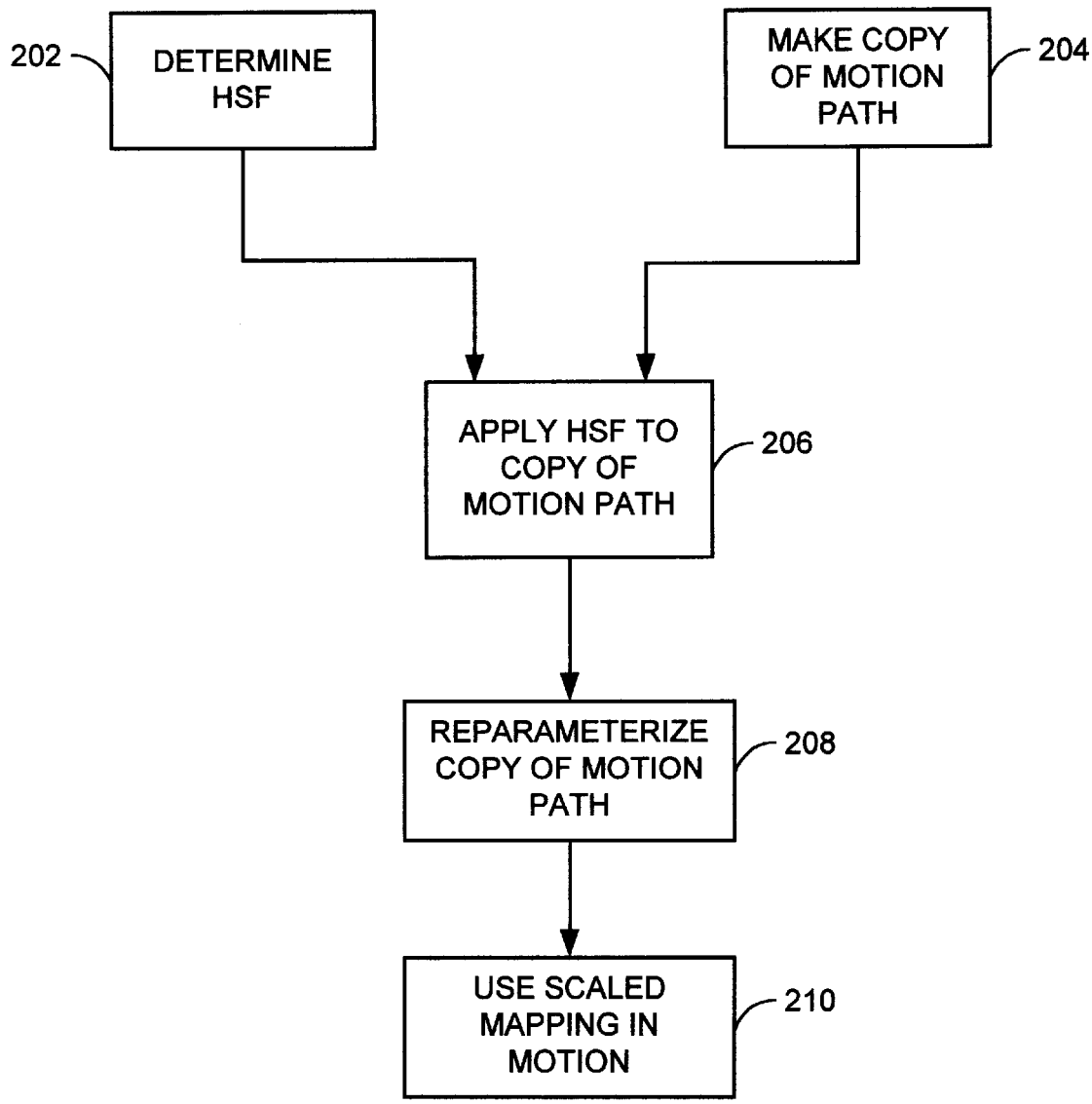
FIG. 2 is a flow chart showing a method for scaling a source motion path to compensate for a nonsquare composition destination pixel aspect ratio.

Referring to FIG. 2, to provide the correct speed for an item along its motion path in the final composition, a compositing process needs to take the pixel aspect ratio of the destination composition into account, if the ratio is not one. An arc-length correction process (200) need only be performed once for any motion path, so it is most conveniently done when a motion path is created or when it is changed.

By way of background, a motion path is typically given or stored as a curve defined by a parametric function of a formal parameter u. To facilitate the definition of smooth velocity changes, the motion path curve is reparameterized by arc-length, so that a point on the motion path can be found as a function of path arc-length s, where arc-length is a function S of time t. The method of reparameterization and for calculating an arc-length (as well as for constructing a timing curve) is explained in a commonly-owned U.S. patent application entitled "Arc-Length Reparameterization," filed concurrently with the present application and incorporated here by reference.

Referring again to FIG. 2, arc-length correction process 200 begins by determining an HSF for the composition (202), which is the destination (composition) pixel aspect ratio itself. Since only the position of layer is relevant to motion, the size and orientation of a layer are not a factor in the scaling, and only the destination pixel aspect ratio needs to be considered.

A copy is made of the motion path (204) and the HSF is applied to scale the copy (206). Reparameterization of arc-length is applied to the scaled copy of the motion path If the composition pixel aspect ratio were one, reparameterization, as described in the above-referenced U.S. patent application, would be applied to the original motion path. Applying reparameterization to the scaled copy of the motion path yields a scaled mapping from path distance to s to formal parameter u that compensates for the nonsquare pixel aspect ratio of the composition—that is, for the different pixel density of vertical movement compared to horizontal movement. The scaled mapping is then used in calculating the position of an object on the motion path at any time t (210). As a result, a motion defined to have a constant velocity appears to move with the same speed when directed vertically as when directed horizontally in the composition.

The invention may be implemented in hardware, firmware, software, or a combination of the three. Preferably, however, the invention is implemented in a computer program executed on a programmable computer having a processor, a data storage system, volatile and nonvolatile memory and/or storage elements, at least one input device, and at least one output device. Program code is applied to input data to perform the functions described herein and generate output information. The output information is applied to one or more output devices, in known fashion.

Figure 3:
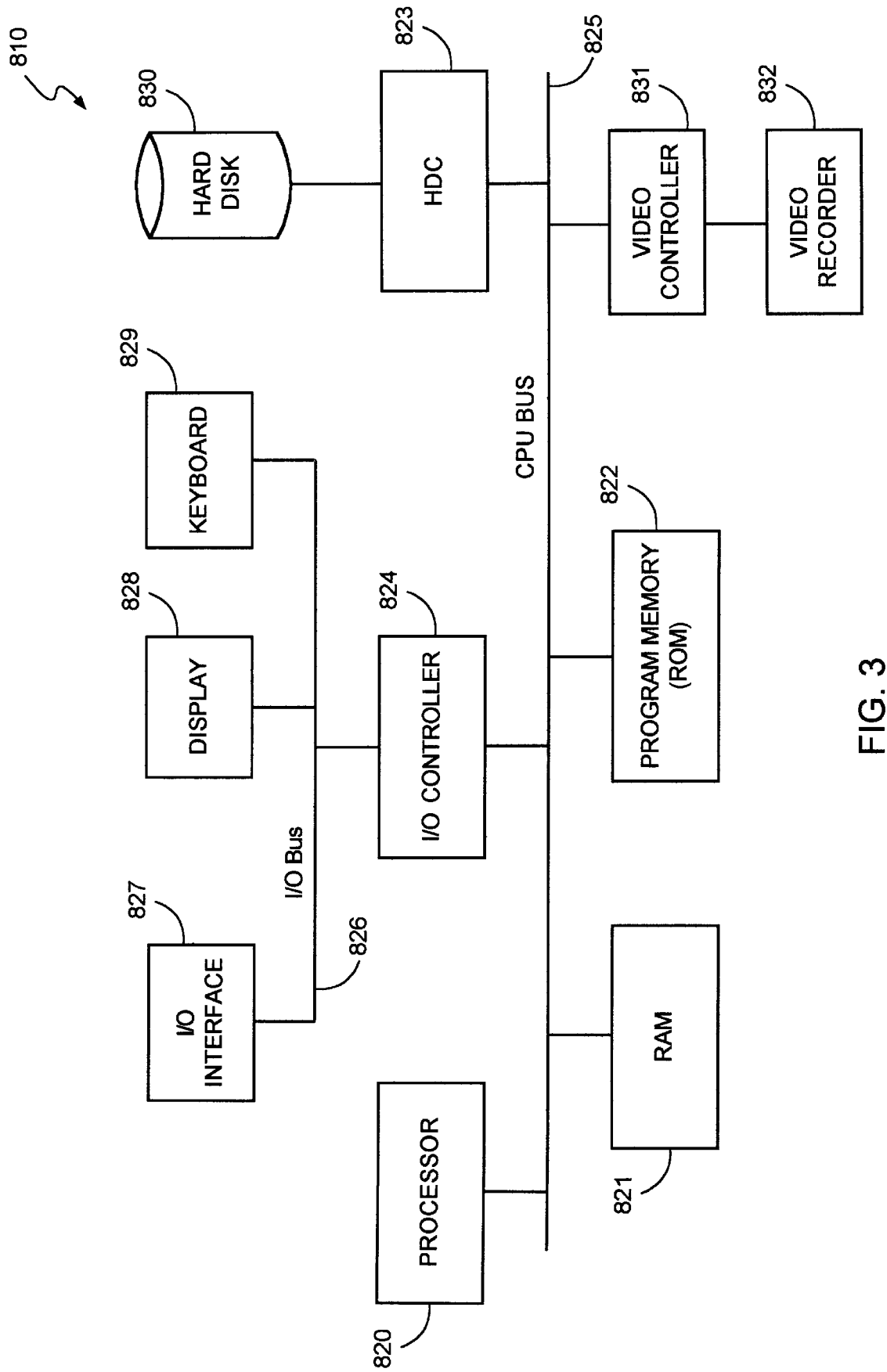
FIG. 3 is a schematic block diagram of a programmable computer suitable for executing computer programs according to the present invention.

By way of example, FIG. 3 shows a block diagram of a programmable processing system (computer) 810. The programmable processing system (computer) 810 preferably includes a processor 820, a random access memory (RAM) 821, a program memory 822 (preferably a writable read-only memory (ROM) such as a flash ROM), a hard drive controller 823, a video controller 831, and an input/output (I/O) controller 824 coupled by a CPU bus 825.

The hard drive controller 823 is coupled to a hard disk 830, which may be used for storing application programs, including programs embodying the present invention, and data including video. The video controller 831 is coupled to a video recorder 832, which may be used for storing and importing video footage and for writing final output. The I/O controller 824 is coupled by means of an I/O bus 826 to an I/O interface 827. The I/O interface 827 receives and transmits data (e.g., stills, pictures, movies, and animations for importing into a composition) in analog or digital form over communication links such as a serial link, local area network, wireless link, and parallel link. Also coupled to the I/O bus 826 is a display 828 and a keyboard 829. Alternatively, separate connections (separate buses) may be used for the I/O interface 827, display 828 and keyboard 829. The system 810 may be preprogrammed or it may be programmed (and reprogrammed) by loading a program from another source (e.g., a floppy disk, CD-ROM, or another computer).

Each computer program is preferably stored on a storage media or device (e.g., program memory 822 or magnetic disk) readable by a general or special purpose programmable computer, for configuring and operating the computer when the storage media or device is read by the computer to perform the procedures described in this specification. The invention may also be considered to be implemented as a computer-readable storage medium, configured with a computer program, where the storage medium so configured causes a computer to operate in a specific and predefined manner to perform the steps of the invention.

The present invention has been described in terms of specific embodiments, which are illustrative of the invention and not to be construed as limiting.

What is claimed is:

1. A method for compositing a plurality of digital images having different pixel aspect ratios to reduce distortion of image content, the plurality of images including a first image having a first pixel aspect ratio and a second image having a second, different pixel aspect ratio, the method comprising:

calculating a scaling factor from the first and second pixel aspect ratios;

scaling the first image by the scaling factor to produce a scaled first image at the second pixel aspect ratio; and compositing the scaled first image and the unscaled second image into a composite image having the second pixel aspect ratio.

2. The method of claim 1 wherein the scaling step is limited to stretching or squashing the first image in only a horizontal direction.

3. The method of claim 1 wherein the scaling step includes resampling the first image.

4. An image composition system for compositing a plurality of images having different pixel aspect ratios to reduce distortion of image content, the plurality of images including a first image having a first pixel aspect ratio and a second image having a second, different pixel aspect ratio, the system comprising:

means for calculating a scaling factor from the first and second pixel aspect ratios;

means for scaling the first image by the scaling factor to produce a scaled first image having the second pixel aspect ratio; and means for compositing the scaled first image and the unscaled second image to produce a composite image having the second pixel aspect ratio.

5. A computer program tangibly recorded on a computer-readable medium for compositing a plurality of digital images having different pixel aspect ratios, the plurality of images including a first image having a first pixel aspect ratio and a second image having a second, different pixel aspect ratio, the computer program comprising instructions for causing a computer to:

calculate a scaling factor from the first and second pixel aspect ratios;

scale the first image using the scaling factor to produce a scaled first image having the second pixel aspect ratio so as to reduce distortion of image content when the first image is composited with the second image; and composite the scaled first image and the unscaled second image into a composite image having the second pixel aspect ratio.

6. The computer program product of claim 5, further comprising instructions for causing the computer to:

apply an effect to the first image.

7. The computer program product of claim 5, further comprising instructions for causing the computer to:

apply a mask to the first image.

8. The computer program product of claim 5, further comprising instructions for causing the computer to:

scale a mask having a perfect shape before the mask is applied to the first image.

9. The computer program product of claim 5, further comprising instructions for causing the computer to:

transform the first image in accordance with a geometry transformation, the geometry transformation comprising an operation selected from the group of image sizing, image translation, and image rotation.

10. The computer program product of claim 9, further comprising instructions for causing the computer to:

apply an effect to the first image;

apply a mask to the first image; and scale a mask having a perfect shape before the mask is applied to the first image.

11. A method for compositing a source image having a first pixel aspect ratio into a destination image having a second different pixel aspect ratio, comprising:

calculating a scaling factor from the first pixel aspect ratio and the second different pixel aspect ratio;

applying an effect to the source image;

scaling the source image in accordance with the scaling factor to produce a scaled image having the second pixel aspect ratio; and compositing the scaled image into the destination image to produce a composite image.

12. The method of claim 11, further comprising applying a mask to the source image.

13. The method of claim 12, wherein the mask has a perfect shape and the method includes scaling the mask before the mask is applied.

14. The method of claim 11, wherein the effect is selected from image effects and channel effects.

15. The method of claim 14, wherein the image effects distort, blur or sharpen the source image.

16. The method of claim 14, wherein the image effects are selected from channel blur, motion blur and radial blur.

17. The method of claim 14, wherein the effect changes one or more pixel color values in the source image.

18. The method of claim 11, wherein the scaling operation is performed in the horizontal direction only.

19. The method of claim 11, further comprising transforming the source image in accordance with a geometry transformation, the geometry transformation comprising an operation selected from the group of image sizing, image translation, and image rotation.

20. The method of claim 12, further comprising transforming the source image in accordance with a geometry transformation, the geometry transformation comprising a operation selected from the group of image sizing, image translation, and image rotation.

21. A system for compositing digital images, comprising:

means for scaling a source image having a source pixel aspect ratio to produce a scaled image having a different destination pixel aspect ratio; and means for compositing the scaled source image and an unscaled second image having the destination pixel aspect ratio into a composite image having the destination pixel aspect ratio.

22. The system of claim 21, further comprising:

means for applying an effect to the source image.

23. The system of claim 21, further comprising:

means for applying a geometry transformation to the source image before scaling the source image.

24. The system of claim 21, further comprising:

means for scaling a mask having a perfect shape before applying the mask to the source image.

* * * * *